(12) United States Patent
Swernofsky et al.

(10) Patent No.: US 11,852,270 B2
(45) Date of Patent: Dec. 26, 2023

(54) COMPACT, BLIND-MATE FLUID FITTING

(71) Applicant: Raytheon Company, Waltham, MA (US)

(72) Inventors: David E. Swernofsky, Richardson, TX (US); Robert Larson, Dallas, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/390,863

(22) Filed: Jul. 30, 2021

(65) Prior Publication Data

US 2023/0036437 A1 Feb. 2, 2023

(51) Int. Cl.
*F16L 37/52* (2006.01)
*F16L 17/00* (2006.01)

(52) U.S. Cl.
CPC ............... *F16L 37/52* (2013.01); *F16L 17/00* (2013.01)

(58) Field of Classification Search
CPC ......... F16L 37/52; F16L 17/00; F16L 21/022; F16L 55/162; F16L 21/035
USPC ....... 285/370, 371, 347, 261, 263, 270, 271, 285/397, 398
See application file for complete search history.

(56) References Cited

U.S. PATENT DOCUMENTS

| | | | |
|---|---|---|---|
| 3,899,199 A * | 8/1975 | Garey | F16L 21/022 |
| | | | 285/321 |
| 4,482,171 A * | 11/1984 | Campbell | F16L 27/1275 |
| | | | 285/900 |
| 5,215,122 A | 6/1993 | Rogers et al. | |
| 6,561,521 B2 * | 5/2003 | Janoff | F16J 15/0887 |
| | | | 277/653 |
| 6,675,833 B2 | 1/2004 | Maldavs | |
| 7,147,003 B2 | 12/2006 | Maldavs | |
| 7,484,530 B2 | 2/2009 | Harvey et al. | |
| 7,862,090 B1 | 1/2011 | Foreman | |
| 8,297,069 B2 | 10/2012 | Novotny et al. | |
| 8,387,949 B2 | 3/2013 | Ekström et al. | |

(Continued)

FOREIGN PATENT DOCUMENTS

| | | |
|---|---|---|
| DE | 102007053002 A1 | 5/2009 |
| KR | 20200099436 A | 8/2020 |

(Continued)

OTHER PUBLICATIONS

Scroggins: "Back to Basics: Quick Disconnects;" Power & Motion; (Apr. 10, 2020); 6 pages; Retrieved from <URL: https://www.powermotiontech.com/hydraulics/hose-tubing/article/21128614/back-to-basics-quick-disconnects>.

(Continued)

*Primary Examiner* — James M Hewitt, II (57) ABSTRACT

A fluid system and a blind-mate fluid fitting can be operable to allow for mating fluid system components even in the presence of angular, radial, and/or axial port misalignment. The blind-mate fluid fitting includes a shoulder and fitting portion extending from one side of the shoulder. The fitting portion defines a central fitting axis and is operable to inserted into a fluid port of a component. The fluid port defines a central port axis. The fitting portion includes a sealing portion that is operable to seal against the fluid port when the central fitting axis is positioned at a zero angle and at least one of a plurality of different non-zero angles relative to the central port axis.

21 Claims, 6 Drawing Sheets

(56) References Cited

U.S. PATENT DOCUMENTS

| | | | |
|---|---|---|---|
| 8,662,541 B2 * | 3/2014 | King | F16L 43/008 285/370 |
| 9,103,478 B2 | 8/2015 | Christian, Jr. et al. | |
| 9,351,428 B2 | 5/2016 | Eckberg et al. | |
| 9,726,440 B2 | 8/2017 | Bhatia et al. | |
| 9,890,887 B2 | 2/2018 | Barthel et al. | |
| 9,942,975 B2 | 4/2018 | Elliott et al. | |
| 10,082,232 B2 | 9/2018 | Christian, Jr. et al. | |
| 10,188,016 B2 | 1/2019 | Lunsman et al. | |
| 2008/0174108 A1 | 7/2008 | Lambert et al. | |
| 2009/0267307 A1 * | 10/2009 | Smith | F16L 25/14 277/584 |
| 2010/0066077 A1 * | 3/2010 | Sharma | F28F 9/0253 285/124.5 |
| 2014/0091532 A1 * | 4/2014 | Unger | F16L 37/025 277/616 |
| 2015/0084329 A1 * | 3/2015 | Freudendahl | F16L 37/148 285/91 |
| 2015/0377393 A1 * | 12/2015 | Schmidt | F16L 55/1141 285/370 |
| 2016/0128238 A1 | 5/2016 | Shedd et al. | |
| 2020/0149667 A1 | 5/2020 | Collins | |
| 2021/0092872 A1 | 3/2021 | Iyengar et al. | |

FOREIGN PATENT DOCUMENTS

| | | |
|---|---|---|
| WO | WO 2014/148982 A1 | 9/2014 |
| WO | WO 2014/148992 A1 | 9/2014 |

OTHER PUBLICATIONS

International Search Report for International Application No. PCT/US2022/031495 dated Sep. 13, 2022, 11 pages.

\* cited by examiner

COMPACT, BLIND-MATE FLUID FITTING

GOVERNMENT LICENSE RIGHTS

This invention was made with government support under a withheld contract. The government has certain rights in the invention.

BACKGROUND

In fluid systems, various components often need to be connected together to allow fluid to flow from one component to another. As just one example fluid system, fluid can flow from an operational component into a heat transfer component to remove heat generated by the operation component.

In some applications, there is limited space to join two components of a fluid system. Further, in some applications, it can be difficult or impossible to access fluid ports of the components to be joined during assembly. Further, due to variations in manufacturing fluid ports intended for interconnection between two components may not be nominally aligned with one another. That is a fluid port on a first component can be angularly, radially, and/or axially offset from a nominal alignment with a fluid port on a second component. Such misalignment can make it difficult to join the fluid ports together with a fitting absent resorting to high-precision tolerances on fluid system fabricated component parts and assembly tooling. Further, such misalignment can lead to fluid systems that are impossible to non-destructively disassemble.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the disclosure is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

There is a need for a fitting that allows for mating fluid system components that is leak-tight, takes up a relatively small volume, and does not require access to one or both fluid ports during assembly. Furthermore, there is a need for a fitting that is capable of providing both angular, radial, and axial port misalignment compensation.

Accordingly, in one example of the disclosure, a blind-mate fluid fitting is provided. The fitting can comprise a shoulder having a stop surface operable to interface with a surface of a first component having a fluid port defining a central port axis of the fluid port. The fitting can further comprise a fitting portion extending from one side of the shoulder and operable to be inserted into the fluid port.

The fitting portion can have a central fitting axis and can include a sealing portion with an annular channel and a compliant seal disposed in the annular channel. The compliant seal can be operable to seal against the fluid port when the central fitting axis is positioned at a zero angle and at least one of a plurality of different non-zero angles relative to the central port axis.

The fitting portion can also include an end portion extending from the sealing portion and defining a distal end. The end portion can comprise a decreasing non-uniform cross-section along the central fitting axis from the sealing portion to the distal end. The end portion can be operable to provide clearance between the fitting portion and the fluid port when the central fitting axis is positioned at one of the plurality of different non-zero angles relative to the central port axis.

The fitting portion can also include an intermediate portion extending from the sealing portion. The intermediate portion can comprise a decreasing non-uniform cross-section along the central fitting axis from the sealing portion towards the shoulder. The intermediate portion can be operable to provide clearance between the fitting portion and the fluid port when the central fitting axis is positioned at one of the plurality of different non-zero angles relative to the central port axis.

In some aspects, the fitting portion can further comprise a transition portion between the intermediate portion and the shoulder. The sealing portion can comprise a secondary compliant seal disposed in a secondary annular channel. The secondary compliant seal can be operable to provide redundancy to seal against the fluid port.

In one example, the fitting further comprises a symmetrical fitting portion extending from an opposite side of the shoulder. The symmetrical fitting portion can be operable to be inserted into a fluid port of a second component to seal against the fluid port of the second component. The symmetrical fitting portion can be operable to seal against the fluid port of the second component when a central fitting axis of the second component is positioned at a zero angle and at least one of a plurality of different non-zero angles relative to the central port axis.

In another example, the fitting can comprise a fixed attachment portion extending from an opposite side of the shoulder. The fixed attachment portion can be operable to be fixed to and sealed against a second component.

In some aspects, the fitting can comprise an extension portion. The extension portion can form part of the shoulder. Alternately, the fitting can comprise a second shoulder. The shoulder can be disposed on a first side of the extension portion and the second shoulder can be disposed on a second side of the extension portion opposite the first side.

In one example, the decreasing non-uniform cross-section of the end portion can form a frustroconical portion of the fitting portion. Alternatively, the decreasing non-uniform cross-section of the end portion can have an outer diameter defined by an arc having a radius of curvature from sealing portion to the distal end. Similarly, the decreasing non-uniform cross-section of the intermediate portion can form a frustroconical portion of the fitting portion. Alternatively, the decreasing non-uniform cross-section of the intermediate portion can have an outer diameter defined by an arc having a radius of curvature from sealing portion toward the shoulder.

In another example of the disclosure, a fluid system is provided. The fluid system can comprise a first component comprising a fluid port defining a central port axis of the fluid port and an outer surface, and a blind-mate fluid fitting. The blind-mate fluid fitting can also comprise a shoulder comprising a stop surface operable to interface with the outer surface of the first component, and a fitting portion extending from one side of the shoulder and operable to be inserted into the fluid port of the first component.

The fitting portion can define a central fitting axis and can include a sealing portion comprising an annular channel and a compliant seal disposed in the annular channel. The compliant seal can be operable to seal against the fluid port when the central fitting axis is positioned at a zero angle and at least one of a plurality of different non-zero angles relative to the central port axis.

The fitting portion can further comprise an end portion extending from the sealing portion and defining a distal end. The end portion can comprise a decreasing non-uniform cross-section along the central fitting axis from the sealing portion to the distal end. The end portion can be operable to provide clearance between the fitting portion and the fluid port when the central fitting axis is positioned at one of the plurality of different non-zero angles relative to the central port axis.

The fitting portion can also comprise an intermediate portion extending from the sealing portion. The intermediate portion can comprise a decreasing non-uniform cross-section along the central fitting axis from the sealing portion towards the shoulder. The intermediate portion can be operable to provide clearance between the fitting portion and the fluid port when the central fitting axis is positioned at one of the plurality of different non-zero angles relative to the central port axis.

In some examples, the fluid system can further comprise a second component comprising a fluid port defining a central port axis of the fluid port and an outer surface. The blind-mate fluid fitting can connect the second component to the first component.

The blind-mate fluid fitting can further comprise a symmetrical fitting portion extending from an opposite side of the shoulder. The symmetrical fitting portion can be operable to be inserted into the fluid port of the second component to seal against the fluid port of the second component. The symmetrical fitting portion can be operable to seal against the fluid port of the second component when a central fitting axis of the second component is positioned at a zero angle and at least one of a plurality of different non-zero angles relative to the central port axis.

In another example, the blind-mate fluid fitting further comprises a fixed attachment portion extending from an opposite side of the shoulder. The fixed attachment portion can be operable to be fixed to and sealed against the second component.

Figure 1:
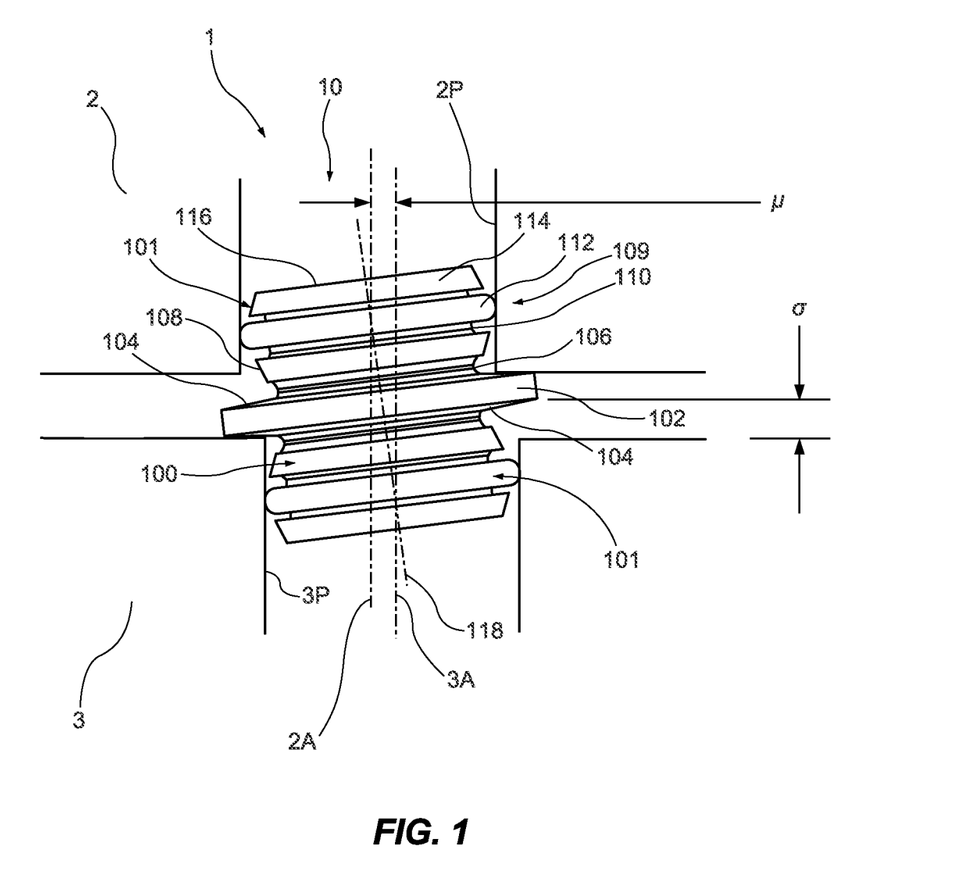
FIG. 1 illustrates a fluid system including a compact, blind-mate fluid fitting according to one example of the present disclosure.

To further describe the present technology, examples are now provided with reference to the figures. With reference to FIG. 1, a fluid system including a compact, miniature, blind-mate fluid fitting is provided. The fluid system 1 comprises a fitting 10 that allows for fluidly connecting or joining or mating two fluid system components, such as first component 2 and second component 3, while consuming a relatively small volume of space, and while not requiring access to fluid ports, such as fluid ports 2P, 3P during assembly. Further, the fitting 10 can mate the first and second components 2, 3 even when the first and second components 2, 3 are radially, axially, and/or angularly misaligned. Thus, the fitting 10 can be relatively compact compared to the first and second components 2, 3 and can facilitate blind mating of the first and second components 2, 3 even when the components 2, 3 are not aligned.

In some examples, the fitting 10 can be used alone to connect the first component 2 to the second component 3. In other examples; multiple fittings 10 can be used to connect multiple ports similar to ports 2P and 3P of the first component 2 and the second component 3. Because the fitting 10 can account and compensate for misalignment between the fluid ports (e.g. fluid ports 2P, 3P) of the first and second components 2, 3, the fluid fitting 10 can facilitate non-destructive disassembly and reassembly when servicing fluid system components where multiple fittings 10 are used to mate the first component 2 to the second component 3.

The fitting 10 can comprise a fluid fitting body 100 that has an internal passage (not shown) to allow a fluid to flow therethrough. The fitting body 100 can have an annular shape along the length of the fitting body 100 with an outer diameter that varies along the length of the fitting body 100. The fitting body 100 can comprise a fitting portion 101 and a shoulder 102. The fitting body 100 can be formed in a symmetrical manner as shown in FIG. 1, such that the fitting body 100 comprises a symmetrical fitting portion 101 on both sides of the shoulder 102. In other words, a fitting portion 101 can extend from one side of the shoulder 102 to a distal end 116 of the fitting portion 101, and a symmetrical fitting portion 101 can extend from the opposite side of the shoulder 102 to an opposite end. Thus, the discussion of features of the fitting portion 101 below are applicable to both symmetrical fitting portions 101 on both sides of the shoulder 102.

The shoulder 102 can comprise a stop surface 104 on both sides of the shoulder 102. The stop surface 104 can be operable to prevent the fitting 10 from extending too far into a fluid port, such as fluid ports 2P, 3P of components 2, 3 The stop surface 104 can be sized and configured to abut against an outer surface of the component 2, 3 to limit insertion and advancement of the fitting portion 101 into the fluid port 2P, 3P to a desired amount or distance.

As mentioned above, the fitting 10 can account for misalignment between ports of components to be mated by the fitting 10. As shown in FIG. 1, the first port 2P of component 2 can have a central port axis 2A, and the second port 3P of component 3 can have a central port axis 3A. The central port axis 2A and the central port axis 3A of the ports 2P, 3P can be radially misaligned, resulting in a radial offset of μ. However, the fitting 10 can compensate for the radial misalignment of the ports 2P, 3P by providing angular displacement of the fitting 10 while still maintaining a proper seal within the ports 2P, 3P. Any axial misalignment σ can similarly be accommodated and compensated for due to the axial displacement of the fitting 10 relative to one or more of the ports 2P, 3P within a given range, and the ability of the fitting portion 101 of the fitting 10 to seal at a plurality of positions along the depth of the ports 2P, 3P.

The stop surface 104 of the shoulder 102 can be formed to further accommodate any needed angular displacement of the fitting 10. The stop surface 104 can have a tapered configuration, such as that an outer diameter of the fitting body 100 tapers or decreases from the outer edge of the shoulder 102 towards the distal end 116. The taper of the stop surface 104 can have a constant angle such that the stop surface 104 forms a frustroconical section of the fitting body 100. The taper of the stop surface 104 can also be formed in a round or curved manner. The taper of the stop surface 104 thus results in the shoulder 102 being thinner in an axial direction at a radial edge of the shoulder 102 and becoming thicker in an axial direction at positions radially inward from the edge of the stop 102.

In some examples where such clearance is not necessary, the stop surface 104 can formed without the taper. In other words, the outer diameter of the fitting body 100 can decrease in a step-like manner from the shoulder 102 to the fitting portion 101 to form stop surface 104, such that the stop surface is parallel with a distal end 116 of the fitting portion 101.

The fitting portion 101 can comprise a transition portion 106. The transition portion 106 can be defined by a portion of the fitting body 100, and particularly that portion of the fitting body 100 defining an outer diameter of the fitting body 100 that transitions from the stop surface 104 of the shoulder 102 to the fitting portion 101. In this example, the transition portion 106 comprises a concave curvature forming a rounded, annual channel. The depth of the concave curvature forming the transition portion 106 can be based on a desired angular displacement of the fitting for a particular application, as will be discussed in more detail below. In some examples, the transition portion 106 can take on different geometries. For example, instead of having a concave curvature, the transition portion 106 can be angular or can form a straight section of the fitting portion 101 where the outer diameter is constant along the length of the transition portion 106.

The fitting portion 101 can further comprise an intermediate portion 108. The intermediate portion 108 extends from the transition portion 106 towards the distal end 116 of the fitting portion 101. The intermediate portion 108 can comprise a non-uniform cross section along the central fitting axis 118 through the intermediate portion 108. For example, the intermediate portion 108 can be defined by an outer diameter of the fitting body 100 that increases from the transition portion 106 toward the distal end 116. The increase in the outer diameter through the intermediate portion 108 can be a constant increase such that the portion of the fitting body 100 defined by the intermediate portion 108 is a frustroconical portion of the fitting body 100. In another example, the outer diameter increasing through the intermediate portion 108 can be at a non-constant rate and can thus be defined by a non-linear curve, such as an arc having a radius of curvature. The angle or curve of the outer diameter of the fitting body 100 in the intermediate portion 108 can be chosen based on the required clearances for a desired angular displacement of the fitting 10 for a particular application, as will be discussed in more detail below.

The fitting portion 101 can further comprise a sealing portion 109 operable to seal against a surface of the fluid ports 2P, 3P. The sealing portion 109 can be disposed on the fitting portion 101 on a distal side of the intermediate portion 108 as taken from the shoulder 102. The sealing portion 109 can comprise an annular channel 110 provided adjacent to the intermediate portion 108. The annular channel 110 is provided on a side of the intermediate portion 108 that is toward the distal end 116 of the fitting portion 101. The annular channel 110 can be sized and configured to receive and support a compliant seal 112 such as an O-ring or a gasket. The compliant seal 112 can be configured to extend radially outward beyond the intermediate portion 108 and beyond an end portion 114 of the fitting portion 101. The compliant seal 112 can be operable to seal against one of the fluid ports 2P, 3P even when a central fitting axis 118 of the fitting 10 is radially and/or angularly offset relative to the central port axes 2A, 3A.

The fitting portion 101 can further comprise an end portion 114. The end portion 114 extends from the sealing portion 109 to the distal end 116 of the fitting portion 101, again as taken or measured from the shoulder 102. The end portion 114 can comprise a non-uniform cross section along the central fitting axis 118 through the end portion 114. For example, the end portion 108 can be defined by an outer diameter of the fitting body 100 that decreases from the sealing portion 109 toward the distal end 116. The decrease in the outer diameter through the end portion 114 can be a constant decrease such that the portion of the fitting body 100 defined by the end portion 114 is a frustroconical portion of the fitting body 100. In another example, the outer diameter decreasing through the end portion 114 can be at a non-constant rate and can thus be defined by a non-linear curve, such as an arc. In some examples, the non-linear curve can be a curve comprising multiple local radii of curvature. The angle or curve of the outer diameter of the fitting body 100 in the end portion 114 can be chosen based on the required clearances for a desired angular displacement of the fitting 10 for a particular application, as will be discussed in more detail below.

Figure 2:
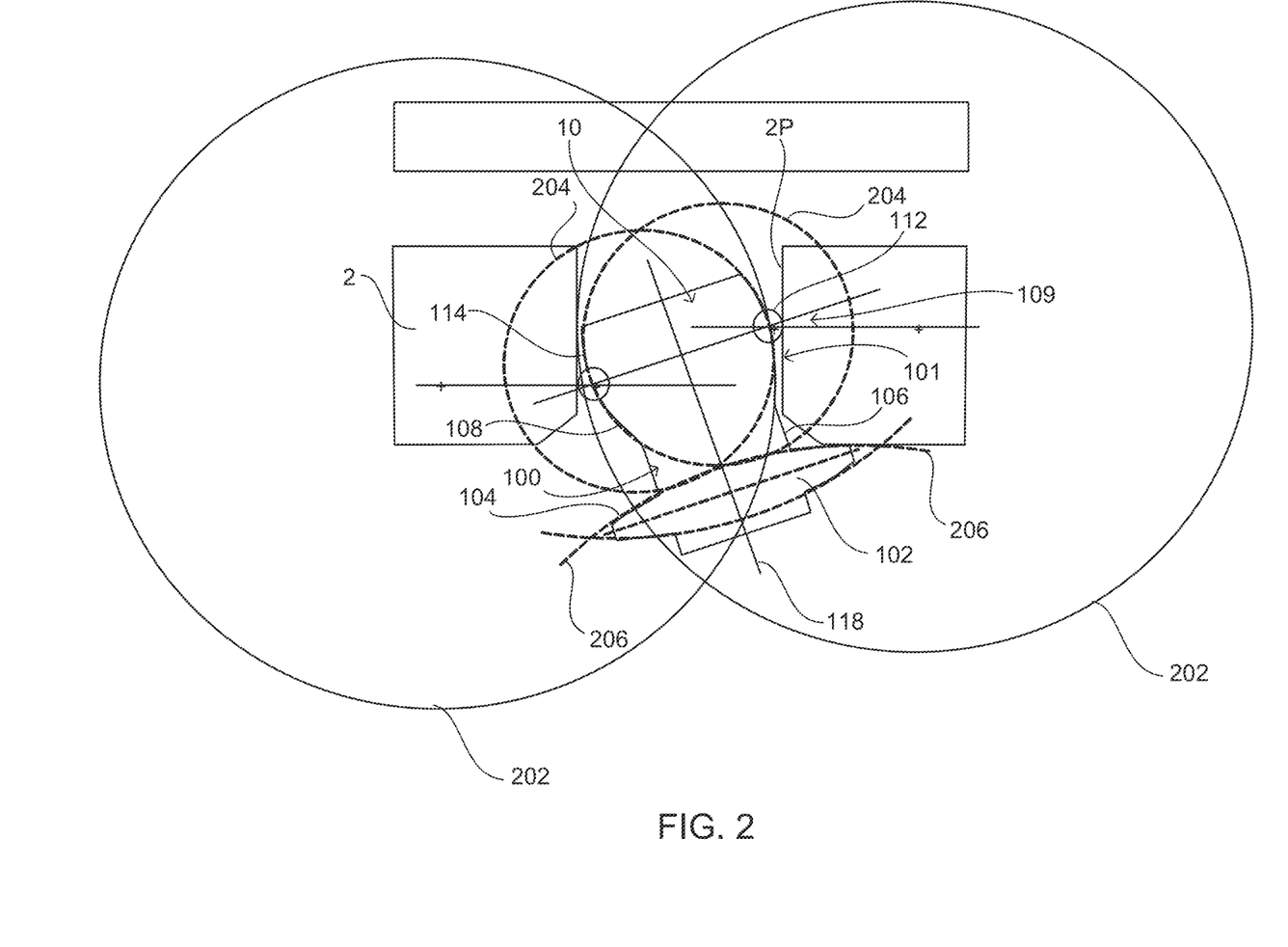
FIG. 2 illustrates geometry for the compact blind-mate fluid fitting of Fla 1 for a desired offset according to one example of the present disclosure.

FIG. 2 illustrates geometry for a compact blind-mate fluid fitting sized and configured to accommodate a desired offset. As shown in FIG. 2 the central fitting axis 118 is shown at an angle with respect to the central port axis of the port 2P. The angle shown in FIG. 2 is selected for ease in explanation and is not meant to be limiting in any way. The angle can be any desired angle according to a particular application.

For this offset angle, circles 202 are shown to define the necessary clearances for upper corners of the end portion 114 of the fitting body and lower corners of the intermediate portion 108 of the fitting body. When the fitting 10 is properly inserted into the port 2P, the intermediate portion 108 and the end portion 114 should not rest against a surface of the port 2P so that the compliant seal 112 can effectively seal against the port 2P.

The compliant seal 112 of the sealing portion 109 seals against the surface of the port 2P due to the compression of the compliant seal 112 as it is forced between the surface of the port 2P and the annular channel 110 (see FIG. 1) of the fitting portion 101. For example, an O-ring can effectively seal between two surfaces when it undergoes compression. Typically, industry standards call for an O-ring to be compressed between 15%-50% to achieve an effective seal. However, this is not to be limiting in any way as sealing can occur with the O-ring compressed between 0% and 100%. For a given maximum offset for a particular application, the fitting 10 can be designed and configured, such that compression of the compliant seal 112 falls within sealing specifications of compression for that particular compliant seal 112. When designing the fitting 10 with a particular maximum offset, it should be done so that the compliant seal 112 falls within the specification of compression for all angles up to a maximum offset angle based on the chosen maximum offset. When taking the compression of the compliant seal 112 into account, the dotted circles 204 define fitting parameters and clearances that can be designed to ensure that no part of the fitting body 100 contacts the surface of the port 2P to allow compression of the compliant seal 112. Similarly arcs 206 can define fitting parameters and clearances of the stop surface 104 that can be designed to facilitate compression of the compliant seal 114 at the desire offset.

Based on the geometries described above the tapers or curves of the stop surface 104, the intermediate portion 108, and the end portion 114 can be designed to ensure that the fitting maintains clearance while also allowing the compliant seal 112 to seal against the fluid port 2P. It should also be noted that the stop surface 104, intermediate portion 108, and the end portion 114 need not be manufactured having a curvature with the radii as shown in FIG. 2, but can also be formed as a straight taper or other curve so long as the clearances defined by the geometry for a given offset are maintained.

Figure 3:
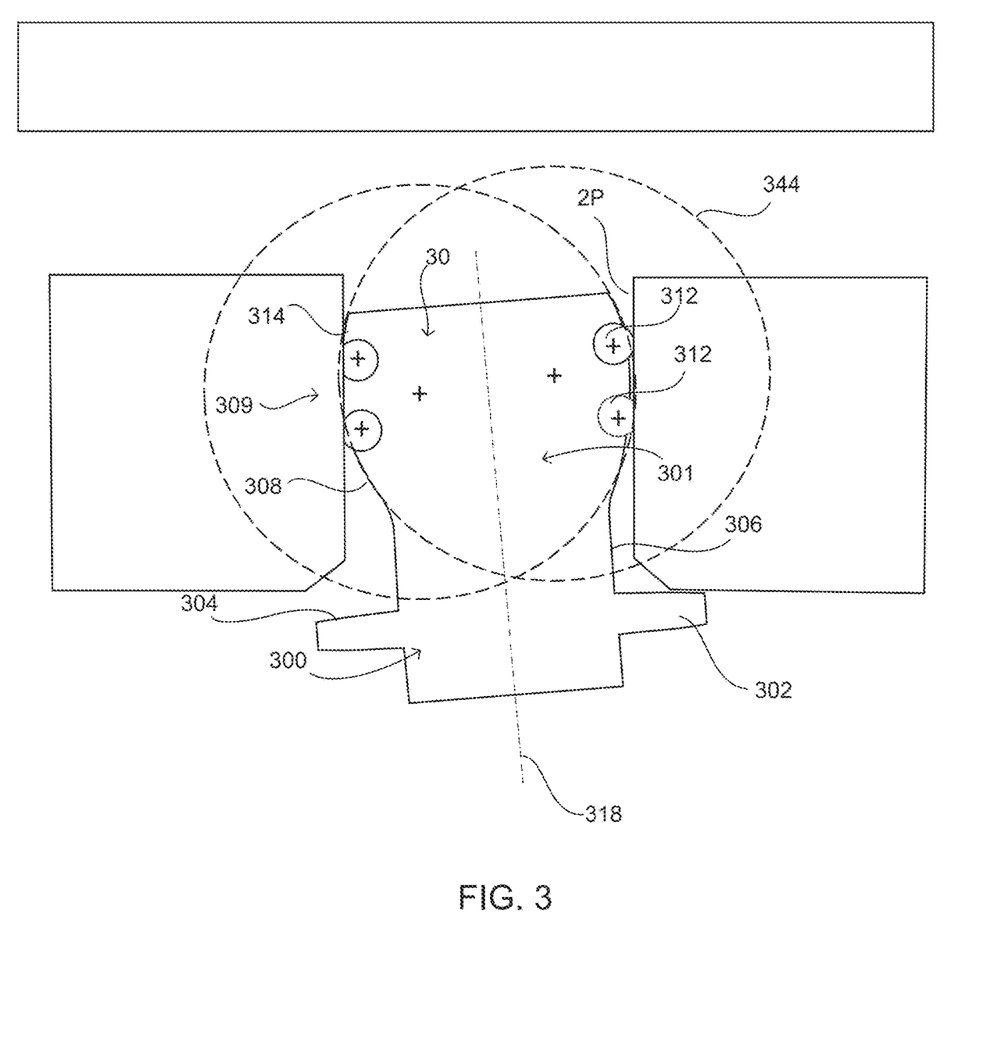
FIG. 3 illustrates geometry for a compact blind-mate fluid fitting for a desired offset, the compact blind-mate fluid fitting having multiple compliant seals according to one example of the present disclosure.

FIG. 3 illustrates geometry for a compact blind-mate fluid fitting for a desired offset having multiple compliant seals. In FIG. 3, a blind-mate fluid fitting 30 is provided. The fitting 30 is similar to fitting 10 in that it comprises a fitting body 300 having a fitting portion 301 and a shoulder 302. The shoulder 302 comprises a stop surface 304, and the fitting portion comprises a transition portion 306, an intermediate portion 308, and an end portion 314. The fitting 30 comprises a sealing portion 209 that is provided with two compliant seals 312 between the intermediate portion 308 and the end portion 314. The two compliant seals 312 can provide redundancy of the sealing capability of the fitting 30. Thus, one of the compliant seals 312 can be considered a backup compliant seal. Each of the compliant seals 312 can be disposed in an annular channel, similar to annular channel 110 shown in FIG. 1.

The design of the fitting 30 can be similar to the design of fitting 10 as discussed above. However, in fitting 30, the geometry of the intermediate portion 308, end portion 314, and stop surface 304 takes into account the compression of both compliant seals 312 to ensure that both compliant seals 312 are compressed within specifications at the desired offset angle as shown by circles 344.

Figure 4:
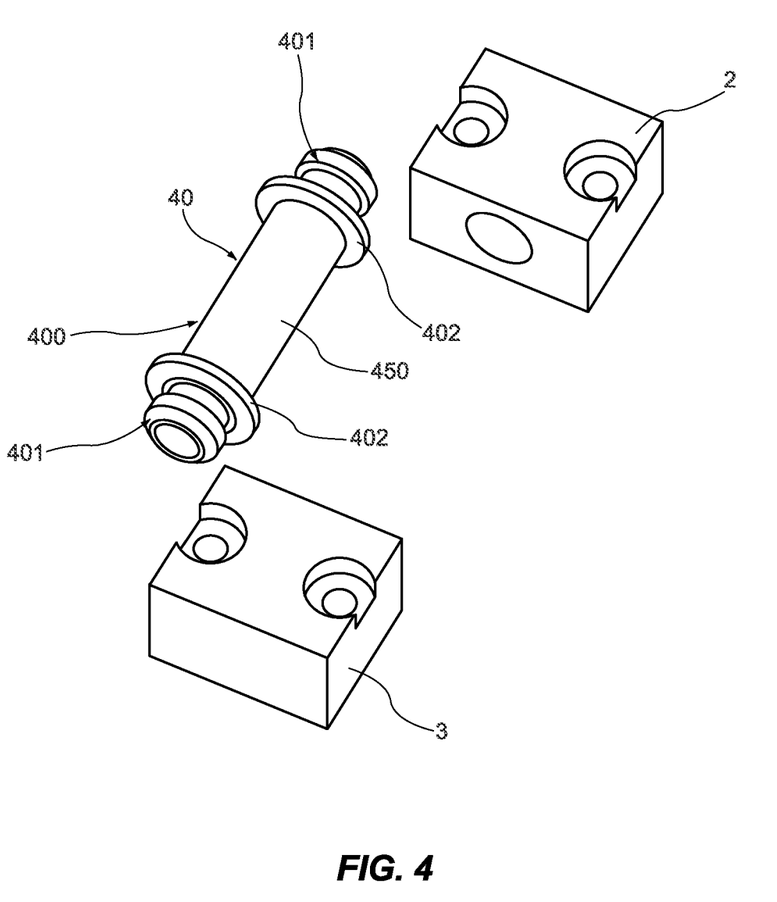
FIG. 4 illustrates a compact blind-mate fluid fitting having an extended length according to one example of the present disclosure.

FIG. 4 illustrates a compact blind-mate fluid fitting having an extended length. In PG. 4, a blind-mate fluid fitting 40 is similar to fittings 10, 30 described above. In some applications fluid components 2, 3 to be mated by the fitting 40 can be at an extended distance from one another as compared to the distance shown in FIG. 1. Thus, the fitting 40 comprises a fitting body 400 with an extension portion 450 that lengthens the fitting 40 as compared to fittings 10, 30. The fitting body 400 further comprises first and second shoulders 402 and fitting portion 401 on both sides of the extension portion 450. The shoulders 402 and fitting portions 401 are similar as those described above, and thus are not described here in detail for brevity. The extension portion 450 can be any desired length allowing the fitting 40 to be used in a variety of applications. In some examples, fittings can be used having different lengths of the extension portion 450, or a combination of fittings without the extension portion 450 (such as fittings 10, 30) and with the extension portion 450 can be used depending on the configuration and array of fluid ports and the components to be connected.

In the example shown in FIG. 4, the shoulders 402 have a larger outer diameter than the extension portion 450. However, the extension portion 450 can take on any geometry. For example, the extension portion 450 can have the same outer diameter as the two shoulders 402 forming a single, extended shoulder. In other words, the shoulder can include the extension portion 450.

Figure 5:
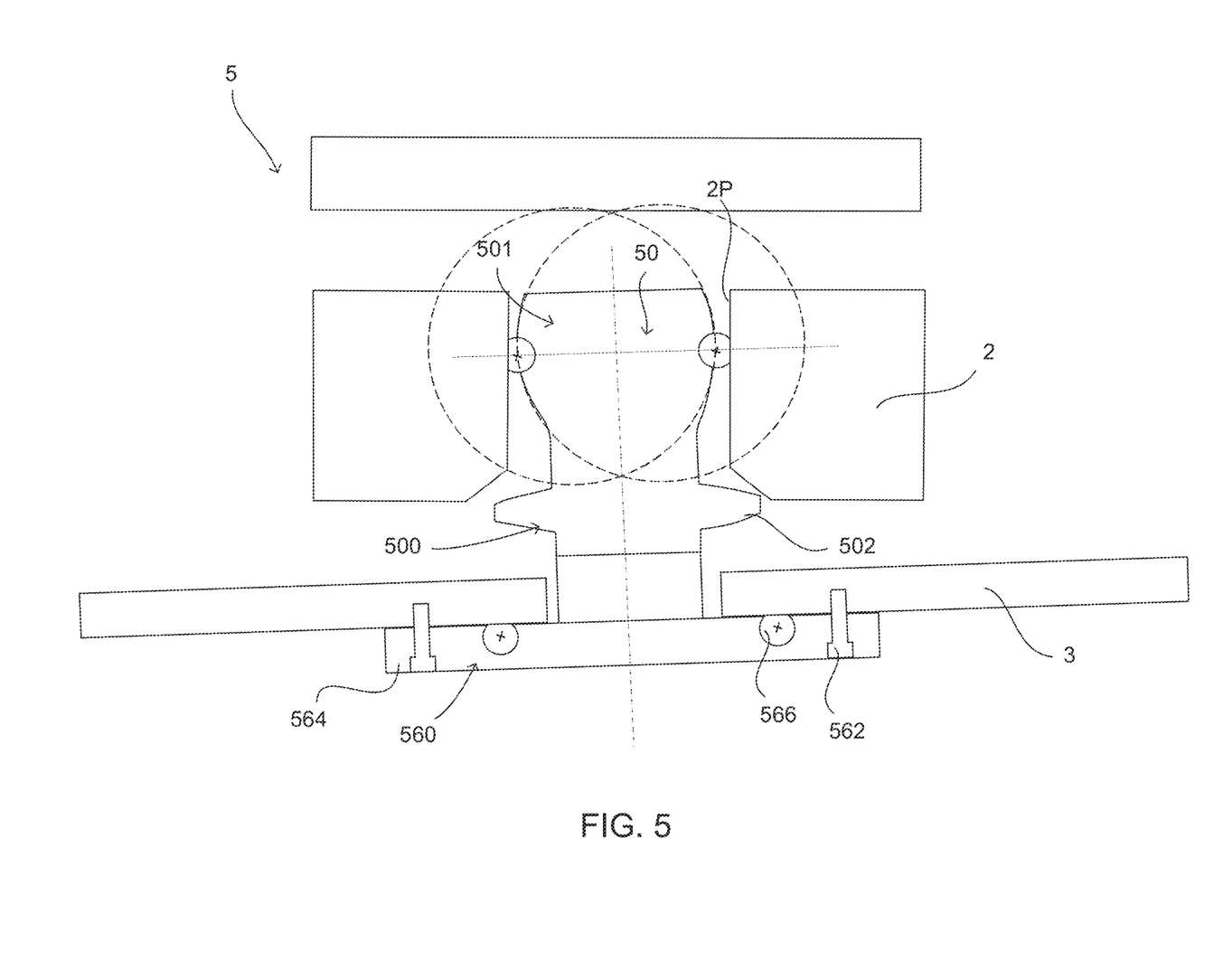
FIG. 5 illustrates a compact blind-mate fluid fitting with a fixed attachment end according to one example of the present disclosure.

In the examples described above, the fittings 10, 30, 40 are substantially symmetrical fittings having fitting portions at both ends. FIG. 5 shows another example of a fluid system 5 comprising a compact blind-mate fluid fitting 50 with a fixed attachment end. In FIG. 5, the fitting 50 is provided with a fitting body 500. The fitting body 500 has a shoulder 502 and fitting portion 501 extending from one side of the stop 502 similar to the fittings described above. The fitting portion 501 is operable to seal against a surface of a fluid port 2P of a fluid component 2 similar to that described above.

On an opposite side of the shoulder 502 is a fixed attachment portion 560. The fixed attachment portion can be fixed to the second fluid component 3 such as via fasteners 562 extending through a flanged portion 564. The fixed attachment portion 560 can further comprise an O-ring or gasket forming the seal between the fixed attachment portion 560 and the second fluid component 3.

The fitting portion 501 of the fitting 50 allows for sealing to the fluid port 2P even when the second fluid component 3 is not angularly and/or radially aligned with the first fluid component 2, as shown in FIG. 2. Thus, the fitting portion of the fluid fittings described herein can be adapted for a variety of applications by combining the above-described fitting portions with any other number of sealing arrangements on the opposite side of the shoulder. Furthermore, the fluid fitting can be integrally formed with a component of a fluid system such that the fitting portions described above extend from a component of a fluid system.

Figure 6:
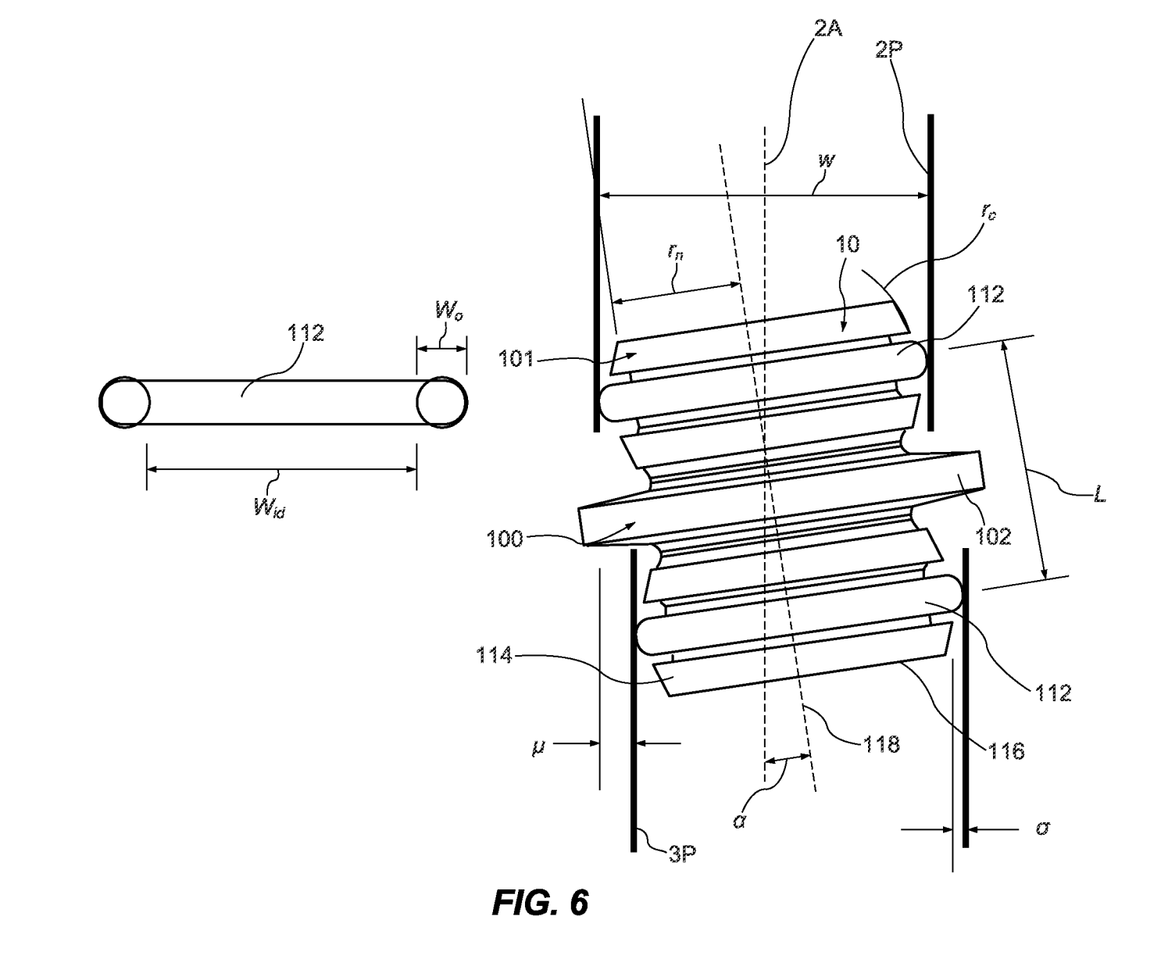
FIG. 6 illustrates angles and distances used for calculating an offset angle and compression of a compliant seal of a compact blind-mate fluid fitting according to one example of the present disclosure.

FIG. 6 illustrates angles and distances used for calculating an offset angle and compression of a compliant seal. As shown in FIG. 6, the fitting 10 can comprise a distance L between the compliant seals 112 of each fitting portion 101 on the fitting body 100. The compliant seals 12 can have an inner diameter $W_{id}$ and a cross-sectional diameter $W_o$, In FIG. 6, the fluid port 2P and fluid port 3P are offset from one another by a distance μ. An inner diameter of the fluid ports 2P, 3P is W.

To determine the compression ratio of the compliant seal 112 when there is no offset between the fluid ports 2P, 3P (i.e. when the fluid ports 2P, 3P are angularly and radially aligned), the following equation can be used:

$$\text{Compression Ratio} = 1 - \frac{W - W_{id}}{2(W_o)}$$

To determine the angular offset angle α caused by the offset p between the ports 2P and 3P, the following equation can be used:

$$\alpha = \sin^{-1}\frac{\mu}{L}$$

Based on the offset angle, the compression ratio of the compliant seal 112 at the offset can be determined as follows:

$$\text{Compression Ratio at Offset} = 1 - \frac{W - W_{id}\cos\alpha}{2W_o}$$

An example will now be provided to illustrate. The fitting 10 can have the following measurements shown in Table 1:

TABLE 1

| Dimension | Value |
|---|---|
| L | 0.257" |
| $W_{id}$ | 0.290" |
| $W_o$ | 0.047" |

The ports 2B, 3B can have the following bore widths and can be offset as follows:

TABLE 2

| Dimension | Value |
|---|---|
| W | 0.350" |
| μ | 0.030" |

In this example, the compliant seal 112 of the fitting 10 undergoes 36.2% compression if it seals against the port without any offset (i.e. when it is angularly and radially aligned). When there is a 0.030" offset, the offset angle α between the central fitting axis 118 and the central port axis 2A is about 6.7 degrees. At this offset, the compliant seal 112 of the fitting undergoes 34.1% compression. Thus, in this example, the compression of the compliant seal 112 is within sealing specifications and will seal against the surface of the fluid ports 2P, 3P even when the fluid ports 2P, 3P are offset.

FIG. 6 also illustrates angles and distances used for calculating a radius of curvature to provide clearance for the fitting. As explained above, the fitting portion 101 is configured to provide clearance even when the fluid ports 2P, 3P are not aligned. This clearance can be calculated based on a maximum offset between the fluid ports and an outer diameter of the compliant seal.

In one example, a desired clearance a can be set between an inner surface of the ports 2P, 3P and the fitting portion 101. A chamfer radius $r_c$ on, for example, the end portion 114 of the fitting portion 101 can be formed in order to maintain the clearance σ even when the ports 2P, 3P are misaligned. Thus, the chamfer radius $r_c$ can be based on a maximum expected offset μ between fluid ports 2P, 3P, the offset angle α, a radius $r_n$ of the distal end 116 of the fitting portion 101, and the desired clearance σ as shown below.

$$r_c = \frac{\mu\cos\alpha}{2} + r_n + \sigma$$

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A blind-mate fluid fitting comprising:
a shoulder comprising a stop surface operable to interface with a surface of a first component having a fluid port defining a central port axis of the fluid port, wherein the stop surface comprises a tapered configuration, and
a fitting portion extending from one side of the shoulder and operable to be inserted into the fluid port, the fitting portion defining a central fitting axis, the fitting portion comprising:
a sealing portion comprising an annular channel and a compliant seal disposed in the annular channel, the compliant seal operable to seal against the fluid port when the central fitting axis is positioned in at least one of a plurality of different non-zero angles relative to the central port axis;
an end portion extending from the sealing portion and defining a distal end, the end portion comprising a decreasing non-uniform cross-section along the central fitting axis from the sealing portion to the distal end, the end portion being operable to provide clearance between the fitting portion and the fluid port when the central fitting axis is positioned at one of the plurality of different non-zero angles relative to the central port axis; and an intermediate portion extending from the sealing portion, the intermediate portion comprising a decreasing non-uniform cross-section along the central fitting axis from the sealing portion towards the shoulder, the intermediate portion being operable to provide clearance between the fitting portion and the fluid port when the central fitting axis is positioned at one of the plurality of different non-zero angles relative to the central port axis.

2. The blind-mate fluid fitting of claim 1, wherein the fitting portion further comprises a transition portion between the intermediate portion and the shoulder.

3. The blind-mate fluid fitting of claim 1, wherein the sealing portion comprises a secondary compliant seal disposed in a secondary annular channel, the secondary compliant seal operable to provide redundancy to seal against the fluid port.

4. The blind-mate fluid fitting of claim 1, further comprising a symmetrical fitting portion extending from an opposite side of the shoulder, the symmetrical fitting portion operable to be inserted into a fluid port of a second component to seal against the fluid port of the second component.

5. The blind-mate fluid fitting of claim 4, wherein the symmetrical fitting portion is operable to seal against the fluid port of the second component when a central fitting axis of the second component is positioned at a zero angle and at least one of a plurality of different non-zero angles relative to the central port axis.

6. The blind mate fluid fitting of claim 1, further comprising a fixed attachment portion extending from an opposite side of the shoulder, the fixed attachment portion being operable to be fixed to and sealed against a second component.

7. The blind mate fluid fitting of claim 1, further comprising an extension portion.

8. The blind mate fluid fitting of claim 7, wherein the extension portion forms part of the shoulder.

9. The blind mate fluid fitting of claim 7, further comprising a second shoulder, the shoulder being disposed on a first side of the extension portion and the second shoulder being disposed on a second side of the extension portion opposite the first side.

10. The blind mate fluid fitting of claim 1, wherein the decreasing non-uniform cross-section of the end portion forms a frustoconical portion of the fitting portion.

11. The blind mate fluid fitting of claim 1, wherein the decreasing non-uniform cross-section of the end portion comprises an outer diameter defined by an arc having a radius of curvature from sealing portion to the distal end.

12. The blind mate fluid fitting of claim 1, wherein the decreasing non-uniform cross-section of the intermediate portion forms a frustoconical portion of the fitting portion.

13. The blind mate fluid fitting of claim 1, wherein the decreasing non-uniform cross-section of the intermediate portion comprises an outer diameter defined by an arc having a radius of curvature from sealing portion toward the shoulder.

14. A fluid system comprising:
a first component comprising a fluid port defining a central port axis of the fluid port and an outer surface; and
a blind-mate fluid fitting comprising:
a shoulder comprising a stop surface operable to interface with the outer surface of the first component, wherein the stop surface comprises a tapered configuration, and
a fitting portion extending from one side of the shoulder and operable to be inserted into the fluid port of the first component, the fitting portion defining a central fitting axis, the fitting portion comprising:
a sealing portion comprising an annular channel and a compliant seal disposed in the annular channel, the compliant seal operable to seal against the fluid port when the central fitting axis is positioned at least one of a plurality of different non-zero angles relative to the central port axis;
an end portion extending from the sealing portion and defining a distal end, the end portion comprising a decreasing non-uniform cross-section along the central fitting axis from the sealing portion to the distal end, the end portion being operable to provide clearance between the fitting portion and the fluid port when the central fitting axis is positioned at one of the plurality of different non-zero angles relative to the central port axis; and
an intermediate portion extending from the sealing portion, the intermediate portion comprising a decreasing non-uniform cross-section along the central fitting axis from the sealing portion towards the shoulder, the intermediate portion being operable to provide clearance between the fitting portion and the fluid port when the central fitting axis is positioned at one of the plurality of different non-zero angles relative to the central port axis.

15. The fluid system of claim 14, further comprising a second component comprising a fluid port defining a central port axis of the fluid port and an outer surface, the blind-mate fluid fitting connecting the second component to the first component.

16. The fluid system of claim 15, wherein the blind-mate fluid fitting further comprises a symmetrical fitting portion extending from an opposite side of the shoulder, the symmetrical fitting portion operable to be inserted into the fluid port of the second component to seal against the fluid port of the second component.

17. The fluid system of claim 16, wherein the symmetrical fitting portion is operable to seal against the fluid port of the second component when a central fitting axis of the second component is positioned at a zero angle and at least one of a plurality of different non-zero angles relative to the central port axis.

18. The fluid system of claim 15, wherein the blind-mate fluid fitting further comprises a fixed attachment portion extending from an opposite side of the shoulder, the fixed attachment portion being operable to be fixed to and sealed against the second component.

19. The blind-mate fluid fitting of claim 1, wherein the compliant seal is operable to seal against the fluid port when the central fitting axis is positioned at a zero angle relative to the central port axis.

20. The fluid system of claim 14, wherein the compliant seal is operable to seal against the fluid port when the central fitting axis is positioned at a zero angle relative to the central port axis.

21. The blind mate fluid fitting of claim 3, wherein the decreasing non-uniform cross-section of the end portion decreases in a direction from the compliant seal to the distal end, and the decreasing non-uniform cross-section of the intermediate portion decreases in a direction from the secondary compliant seal to the shoulder.

\* \* \* \* \*